(12) United States Patent
Hood

(10) Patent No.: US 8,440,273 B2
(45) Date of Patent: May 14, 2013

(54) COATING COMPOSITION FOR FORMING A GLOSSY INKJET-RECEPTIVE COATING ON A SUBSTRATE

(75) Inventor: David K. Hood, Basking Ridge, NJ (US)

(73) Assignee: IP Investments Inc., Wilmington, DE (US)

( * ) Notice: Subject to any disclaimer, the term of this patent is extended or adjusted under 35 U.S.C. 154(b) by 1078 days.

(21) Appl. No.: 11/198,963

(22) Filed: Aug. 8, 2005

(65) Prior Publication Data

US 2007/0032588 A1    Feb. 8, 2007

(51) Int. Cl.
  *B41M 5/00*  (2006.01)
  *C08K 3/36*  (2006.01)

(52) U.S. Cl.
  USPC ......... 428/32.34; 524/492; 524/493; 524/516

(58) Field of Classification Search .................. 524/492, 524/493, 516; 428/32.34
See application file for complete search history.

(56) References Cited

U.S. PATENT DOCUMENTS

| | | | | |
|---|---|---|---|---|
| 4,455,331 A | * | 6/1984 | Barsotti | 428/446 |
| 6,224,971 B1 | * | 5/2001 | Tomizawa et al. | 428/32.38 |
| 6,391,428 B1 | * | 5/2002 | Ueno et al. | 428/32.31 |
| 6,511,736 B1 | * | 1/2003 | Asano et al. | 428/195.1 |
| 6,562,441 B1 | * | 5/2003 | Maeda et al. | 428/32.34 |
| 6,592,953 B1 | * | 7/2003 | Ceruti et al. | 428/32.24 |
| 7,651,748 B2 | * | 1/2010 | Hood et al. | 428/32.34 |
| 2003/0224129 A1 | * | 12/2003 | Miyachi et al. | 428/32.1 |
| 2006/0041059 A1 | * | 2/2006 | Fukasawa et al. | 525/56 |
| 2007/0092666 A1 | * | 4/2007 | Hood et al. | 428/32.34 |

* cited by examiner

*Primary Examiner* — Vickey Nerangis
(74) *Attorney, Agent, or Firm* — William J. Davis; Thompson Hine, LLP

(57) ABSTRACT

A coating composition for forming a glossy, inkjet-receptive coating on a substrate includes (a) a cationic polymer, and (b) colloidal silica having an average particle size in the nanometer range.

8 Claims, 2 Drawing Sheets

COATING COMPOSITION FOR FORMING A GLOSSY INKJET-RECEPTIVE COATING ON A SUBSTRATE

BACKGROUND OF THE INVENTION

1. Field of the Invention

This invention relates to inkjet-receptive coating compositions, and, more particularly, to coating compositions of a cationic polymer and colloidal silica having a particle size in the nanometer range, which provide glossy, inkjet-receptive coatings on a substrate.

2. Description of the Prior Art

The image quality of inkjet printing has begun to approach that of silver halide photography and these advances have carried inkjet printing to the point where a further advance now depends on the quality of inkjet papers. An inkjet printed image on plain paper is generally inferior to a silver halide image on photographic paper, but it becomes difficult to distinguish between the two when the inkjet printing is performed on high-grade photo paper.

Currently, three types of inkjet paper are used: cast-coated, swelling and microporous paper. Cast-coated paper is of limited image quality as its base paper absorbs ink. Swelling and microporous papers use a polyethylene (PE) coated base paper that makes the base impermeable to ink. The PE coated bases, however, do not absorb ink; hence the image quality of swelling and microporous papers depends chiefly on the mechanisms of the image receiving layers. Swelling papers consist mainly of water-soluble polymers, offering high optical density, but slow drying, disadvantageous curl and low water resistance. Printing on plastic or fabric presents even more problems particularly with respect to achieving fast ink drying times.

Colloidal silicas are useful for the preparation of tough, inkjet-printable coatings on substrates. However, the use of these materials to form highly glossy coatings which are inkjet-printable and have water resistance continues to challenge the art.

Accordingly, it is an object of this invention to provide new and improved inkjet-receptive coatings, and compositions therefor, and, particularly, to such compositions which will provide glossy inkjet-receptive coatings on a substrate.

Another object of the invention is to provide a compatible coating composition of a cationic polymer and colloidal silica which can be coated onto a substrate such as paper, polyester or vinyl, to receive a glossy inkjet image.

Still another object herein is to provide an inkjet-printed image which is also water resistant.

These and other objects and features of the invention will be made apparent from the following description.

IN THE DRAWINGS

SUMMARY OF THE INVENTION

Figure 1:
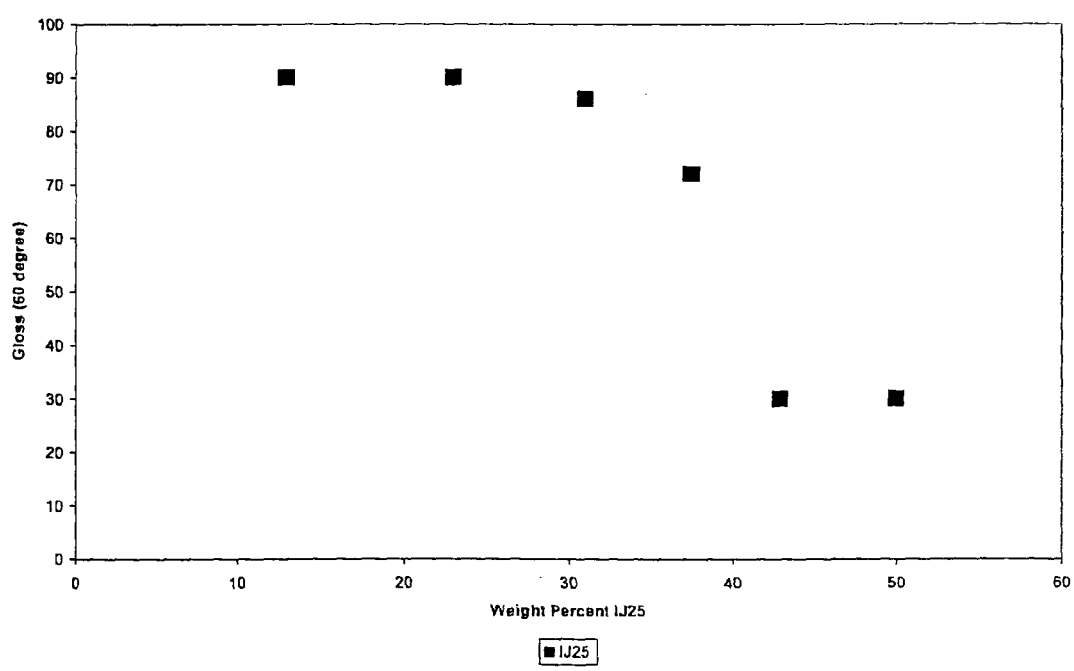
FIG. 1 is a graph of Gloss Value (60°) vs, wt. % Colloidal Silica in coatings on a polyester substrate formed from a composition of ViviPrint™ 200 cationic polymer and colloidal silica (IJ-25).

What is described herein is a compatible inkjet-receptive coating composition for making glossy inkjet-receptive coatings on a substrate comprising:

(a) a cationic polymer, and (b) colloidal silica having an average particle size in the nanometer range.

Suitably, the coating composition includes (a) a water soluble polyvinyl lactam, e.g. vinyl caprolactam (VCL) or polyvinylpyrrolidone (PVP), or copolymers thereof, and blends of such polymers.

Preferably the colloidal silica (b) has an average particle size of less than 100 nm, most preferably about 25 to 50 nm.

Additional binders may also be present in the composition e.g. polyvinyl alcohol, cationic polyurethane dispersion, latex and the like.

Suitably, the composition of the invention comprises, by weight, (a) 45 to 95% and (b) 5 to 55%.

DETAILED DESCRIPTION OF THE INVENTION

In accordance with the invention, the cationic polymer (a) is a water soluble vinyl lactam polymer, e.g. polyvinylpyrrolidone (PVP), or copolymer thereof, e.g. with vinyl acetate, ViviPrint™ 540 (ISP), ViviPrint™ 530 or ViviPrint™ 200 (ISP), which may be partially crosslinked. Binders such as a cationic polyurethane dispersion, e.g. Witcobond® W213, polyvinyl alcohol, a latex, cellulose and the like also may be present. Most preferably, a blend of cationic polymers and additional binder is used to increase the water resistance and decrease the tackiness of the coating.

The colloidal silica (b) component suitably has an average particle size in the nano particle range, and is preferably colloidal silica IJ-25 or IJ-50 (Millennium) which have particle sizes of about 25 and 50 nm, respectively.

The examples which follow will illustrate the invention in more detail.

EXAMPLE 1

An inkjet-receptive coating composition was prepared as follows:

Provide 5 g of Witcobond® W213 (Crompton).

Add 10 g water. Mix thoroughly.

Add 5.6 g of ViviPrint™ 540 PVP (crosslinked) (ISP, 10% solids). Mix thoroughly.

Add 0.02 g of Surfadone® LP-100 (ISP). Mix thoroughly.

Add 1 g of IJ-25 colloidal silica (Millennium). Mix thoroughly. Coating composition has 11% solids. Dry at 110° C. in air oven.

TABLE 1

| Component | Mass (g) | Solids (g) | Wt. % in Composition |
|---|---|---|---|
| ViviPrint ™ 540 (11% Solids) | 5.6 | 0.56 | 23.5 |
| Witcobond ® W213 (30% Solids) | 5 | 1.5 | 63 |
| IJ-25 (30% Solids) | 1 | 0.3 | 12.6 |
| Surfadone ® LP-100 | 0.02 | 0.02 | 0.8 |
| Water | 10 | | |

The composition above was coated using a #40 Meyer rod onto Dupont-Teijen Melanex® film (polyester). The gloss observed was ~90 at 60° using a BYK Gardner Glossmeter (Glossmeter Test). The inkjet print quality on HP 880 was excellent. On Filiperson 180 paper, the coating had a similar gloss level and dried substantially instantly.

EXAMPLE 2

Provide 5 g of water.

Add 7 g of polyvinyl alcohol, PVOH (20% solids in water) (13,000-23,000 molecular weight, 87-89% hydrolyzed polymer). (Aldrich). Mix thoroughly.

Add 1 g of ViviPrint™ 200 (ISP, 30% solids)*. Mix thoroughly.

Add 1 g of IJ-25 colloidal silica (Millennium). Mix thoroughly. Dry at 110° C. in air oven. Coating composition has 14% solids.

TABLE 2

| Component | Mass (g) | Solids (g) | Wt. % in Composition |
|---|---|---|---|
| ViviPrint ™ 200 (30% Solids) | 1 | 0.3 | 15 |
| PVOH (20% Solids) | 7 | 1.4 | 70 |
| IJ-25 (30% Solids) | 1 | 0.3 | 15 |
| Water | 5 | | |

* Quaternized terpolymer of 80 wt. % vinyl caprolactam/5 wt. % hydroxy/ethyl/methacrylate/15 wt. % dimethylaminopropyl methacrylamide HCl (ISP)

The composition of Example 2 was coated onto a Melanex® substrate. The gloss of the coated substrate before printing was ~90 at 60°. HP 880 print quality is excellent. On Filiperson 180 paper the coating had a similar gloss and dried substantially instantly.

EXAMPLE 3

TABLE 3

| Ingredient | Mass (g) | Solids (g) | Wt. % in Composition |
|---|---|---|---|
| Water | 10 | | |
| ViviPrint ™ 540* (11% Solids) (ISP) | 5.6 | 0.62 | 86 |
| IJ-25 (30% Solids) | 0.3 | 0.1 | 14 |

Gloss 90+
*PVP (crosslinked)

EXAMPLE 4

TABLE 4

| Ingredient | Mass (g) | Solids (g) | Wt. % in Composition |
|---|---|---|---|
| Water | 10 | | |
| ViviPrint ™ 530* (22% Solids) (ISP) PVP K-90 | 3.3 | 0.73 | 86 |
| IJ-25 (30% Solids) | 0.39 | 0.12 | 14 |

Gloss 90+
*PVP (uncrosslinked)

EXAMPLE 5

TABLE 5

| Ingredient | Mass (g) | Solids (g) | Wt. % in Composition |
|---|---|---|---|
| Water | 5 | | |
| ViviPrint ™ 200 (30% Solids) | 1 | 0.3 | 87 |
| IJ-25 (30% Solids) | 0.15 | 0.045 | 13 |

Gloss 90+

FIG. 1 show the effect of composition on gloss. The highest gloss is achieved with a ViviPrint™ 200/IJ-25 composition of 70-95%:5-30%, respectively.

Figure 2:
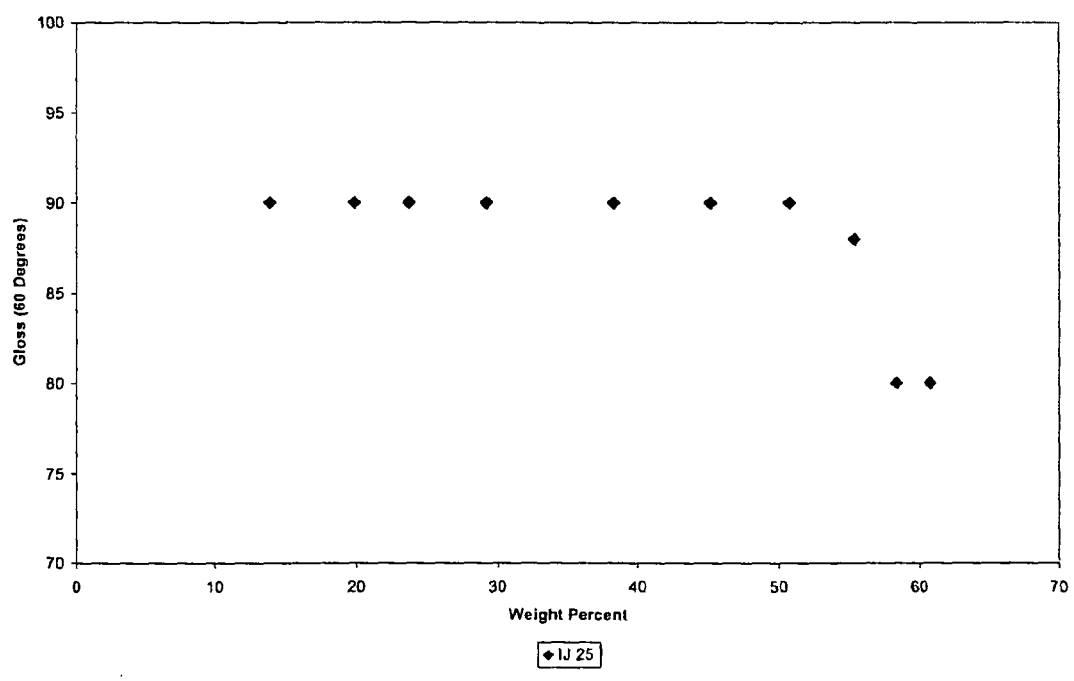
FIG. 2 is a similar graph for a coating composition of ViviPrint™ 530S (PVP K-90 solution —22%) and colloidal silica (IJ-25).

FIG. 2 shows the effect on gloss in a ViviPrint™ (PVP)/IJ-25 composition. The highest gloss is achieved at 45-95%/5-55%, respectively.

While the invention has been described with particular reference to certain embodiments thereof, it will be understood that changes and modifications may be made which are within the skill of the art.

What is claimed is:

1. A coating composition for making glossy inkjet-receptive coatings on a substrate comprising:
   (a) a cationic polymer selected from the group consisting of vinyl lactam polymer, polyvinylpyrrolidone, copolymers thereof, and blends of such polymers,
   (b) colloidal silica having an average particle size in the nanometer range,
   (c) water,
   (d) an additional binder selected from the group consisting of a latex, polyvinyl alcohol, cellulose, a cationic polyurethane dispersion and combinations thereof; and
   (e) optionally, a crosslinker,
   wherein (a) is 45 to 95% and (b) is 5 to 55% by dry weight based on the total dry weight of (a) and (b), wherein said coating composition provides glossy inkjet receptive coatings on a substrate having a gloss of about 90 or more at 60°.

2. A composition according to claim 1 wherein (b) has an average particle size of less than 100 nm.

3. A composition according to claim 2 wherein (b) has an average particle size of about 25 to 50 nm.

4. A composition according to claim 1 wherein said binder is a cationic polyurethane dispersion.

5. A composition according to claim 1 wherein, by weight, (a) is 70 to 95%, and (b) is 5 to 30% by dry weight based on the total dry weight of (a) and (b).

6. A composition according to claim 1 wherein said composition comprises the optional crosslinker and the crosslinker is selected from the group consisting of polyaziridine, glyoxal, polyepoxy, melamine/formaldehyde, ammonium zirconium carbonate, a borate, oxides of zinc, a carbodiimide and combinations thereof.

7. A substrate coated with the composition of claim 1.

8. A coated substrate according to claim 7 wherein the substrate is paper, polyester, vinyl, or textile.

* * * * *